United States Patent
Spooner (10) Patent No.: US 10,650,238 B2
(45) Date of Patent: May 12, 2020

(54) OPPORTUNITY TO VIEW AN OBJECT IN IMAGE PROCESSING

(71) Applicant: Shawn Spooner, Beaverton, OR (US)

(72) Inventor: Shawn Spooner, Beaverton, OR (US)

(73) Assignee: BOOHMA TECHNOLOGIES LLC, Lake Oswego, OR (US)

( * ) Notice: Subject to any disclaimer, the term of this patent is extended or adjusted under 35 U.S.C. 154(b) by 193 days.

(21) Appl. No.: 15/938,750

(22) Filed: Mar. 28, 2018

(65) Prior Publication Data

US 2019/0303669 A1 Oct. 3, 2019

(51) Int. Cl.
*G06K 9/00* (2006.01)
*G06Q 30/02* (2012.01)
*G06N 20/00* (2019.01)

(52) U.S. Cl.
CPC ..... *G06K 9/00671* (2013.01); *G06K 9/00637* (2013.01); *G06N 20/00* (2019.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 6,286,005 B1 * | 9/2001 | Cannon | ............... | G06Q 30/02 455/2.01 |
| 6,970,131 B2 * | 11/2005 | Percy | ............... | G01S 5/0027 342/357.52 |
| 8,340,685 B2 * | 12/2012 | Cochran | ............... | H04W 4/029 455/456.1 |
| 9,058,619 B2 | 6/2015 | Nandakumar et al. | | |
| 2006/0053110 A1 | 3/2006 | McDonald et al. | | |
| 2008/0077469 A1 | 3/2008 | Philport et al. | | |
| 2008/0306804 A1 | 12/2008 | Opdycke; et al. | | |
| 2010/0164863 A1 | 7/2010 | Tunick et al. | | |
| 2013/0339140 A1 | 12/2013 | Pokorny et al. | | |
| 2015/0032541 A1 | 1/2015 | Haddad et al. | | |
| 2017/0213240 A1 | 7/2017 | Waldron et al. | | |

OTHER PUBLICATIONS

Banerjee, Sujoy, and Michael Greene. "Assessing Brand Visibility Using Machine Learning." (2016).

\* cited by examiner

*Primary Examiner* — Vikkram Bali
(74) *Attorney, Agent, or Firm* — Lempia Summerfield Katz LLC (57) ABSTRACT

Image processing of an image is used to determine the opportunity to view an object. Rather than relying on simple numbers passing an object, the opportunity to view the object is weighted based on attention, which is derived from other objects competing for attention. For the processor to more accurately determine opportunity to view as compared to using geometric information alone, a machine-learned network is used. To deal with changes in obstructions, another machine-learned network may extract obstructions from camera images. Trace data is used to allow for daily variation in base counts of viewers, allowing greater temporal resolution and determination based on information more recently acquired than counts.

16 Claims, 3 Drawing Sheets

FIG. 4

OPPORTUNITY TO VIEW AN OBJECT IN IMAGE PROCESSING

BACKGROUND

The present embodiments relate to determining an opportunity to view an object. As viewers travel, different obstructions may limit the opportunity to view. Other objects of interest may distract a viewer's attention. Both obstructions and objects of interest may change over time, so the opportunity to view is dynamic.

Opportunity to view may be modeled. In one simple model, rubber hoses with pressure sensors are placed over roadways. A count of the number of vehicles passing along the roadway over a period represents the opportunity to view an object, such as a billboard, along the roadway. This simple model is not dynamic, such as the counts not being accurate by day, week, or even month. This simple model does not account for obstructions or changes in obstructions. This simple model does not address competition for attention of the viewers.

SUMMARY

By way of introduction, the preferred embodiments described below include methods, computer readable media, and systems for determining an opportunity to view an object. Image processing of an image is used to determine the opportunity. Rather than relying on simple numbers passing an object, the opportunity to view the object is weighted based on attention, which is derived from other objects competing for attention. For the processor to more accurately determine opportunity to view as compared to using geometric information alone, a machine-learned network is used. To deal with changes in obstructions, another machine-learned network may extract obstructions from camera images. Trace data is used to allow for daily variation in base counts of viewers, allowing greater temporal resolution and determination based on information more recently acquired than counts.

In a first aspect, a method is provided for determining an opportunity to view a first object in an image processing system. A travel path is linked to the first object based on a geometrical relationship of the travel path to the first object. Camera images from along the travel path linked to the first object are loaded. A first machine-learned network identifies the first object and other objects in the camera images. A center of focus of the camera images is randomly perturbed. A likelihood of viewing the first object is determined from the perturbed center of focus and from attention determined by a second machine-learned network. The second machine-learned network is a generative adversarial network trained to indicate the point of attention based on the first object and other objects and the camera images. The opportunity to view the first object as based on the likelihood is output.

In a second aspect, a method is provided for determining an opportunity to view a first object in an image processing system. A number of mobile devices traveling along a travel path is identified from trace data. Panoramic images from the travel path are loaded. The panoramic images include a plurality of objects including the first object. For each of the mobile devices, a relative attention of a viewer on the first object relative to others of the objects is estimated by a machine-learned network from the panoramic images. The opportunity to view the first object is determined with the number and the relative attentions. The opportunity to view is transmitted.

In a third aspect, a system is provided for determining an opportunity to view a first object. A database of objects including the first object is provided. Each of the objects has a display surface. The database also includes roadway segments linked to each of the objects. An image processor is configured by instructions stored in a memory to determine a viewability area of the display surface of the first object from the roadway segments with a first machine-learned network, estimate a time spent by each of a plurality of mobile devices in the viewability area from trace data for the mobile devices, adjusting the time spent by an amount of attention from a second machine-learned network responsive to images of the objects from the roadway segments, and calculate the opportunity to view for the first object from the adjusted times spent in the viewability areas. A display is configured to display the opportunity to view the first object.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

The opportunity to view an object is weighted by an attention model. Machine learning is used to determine viewability and/or attention. The location of a display surface to use for any purpose, such as a notification or advertisement, may be determined. Which of various display surfaces to use may be determined. By using machine learning-based correction for attenuation, image processing may be used to determine a more accurate indication of opportunity to view the object. The use of machine learning results in more rapid determination by the image processor as compared to probabilistic calculations, such as by an order of magnitude. By using trace data, the determination may be timelier and/or have a better temporal resolution.

In one embodiment, the opportunity to view is used for out of home (OOH) placement. By knowing the latitude, longitude, and facing angle of a display surface, an area of visibility around the structure is determined from geometry. Subtracting out any visual obstructions and occluding the areas beyond them from perspective of the display surface leaves the geospatial area a person has to be in to be able to physically view the display surface. Calculating the trajectory and velocity by mode of travel (e.g., bus, car, bike, or walking along a road, bikeway, sidewalk, or track), the time spent in the viewability area where a significant portion (e.g., likelihood above a threshold) of the viewers' attention field falls over the face of the display surface is determined. A penalty term is included in the time spent or likelihood for the amount of attention that is spent in other portions of the visual field. The time spent or likelihood provides a probability that a viewer had the opportunity to see and take in the message of this display surface. A probability distribution is provided for each viewer. Summing over the distributions provides a total opportunity to see the display surface. The sum may be a weighted average over various points on the approach vector to the display surface.

Application using a machine-learned network speeds determination and may provide more accurate information in a broader range of situations, even where the situation is not used in training. In one embodiment, a deep neural network architecture, such as based around variational auto-encoders (generative adversarial network using physics-based convention of energy) to generate attention maps, is used to reconstruct the scene from the encoder to the decoder. The amount of attention that is pooled over any object in the screen is determined. This image is then feed into another neural network based on stacked convolution layers to identify high focus areas in the original image for different objects (e.g., wallscape, car, person, other display surfaces, obstructions, natural objects (e.g., tree), or others). Based on the focus areas or attention for the various objects in each scene, the amount of focus a given display surface receives is determined. The amount of focus is used to derive the opportunity to view.

Figure 1:
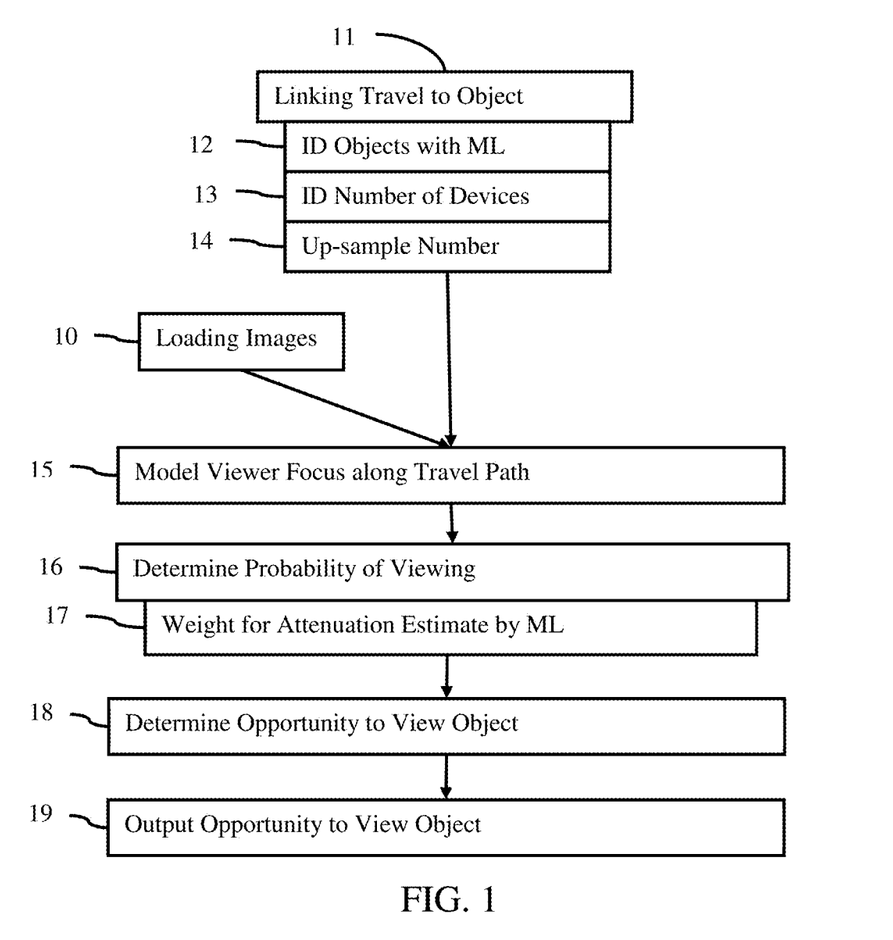
FIG. 1 is a flow chart diagram of one embodiment of a method for determining an opportunity to view an object in an image processing system.

FIG. 1 shows one embodiment of a method for determining an opportunity to view an object in an image processing system. The opportunity to view different objects may be used to determine an optimum object for display of a message. For example, multiple billboards, interior ad surfaces of a bus, exterior ad surfaces of a bus, wallscapes, transit shelters, banners, poster locations, plaster poster locations, and/or other surfaces are provided in a region. Different travel paths, such as roads, walkways, bike paths, and/or commonly traveled paths may provide views of the different display surfaces. The number of viewers may vary by hour, day, week, or month. Buildings, trees, and/or other obstructions may limit the amount of time that a display surface may be viewed from any of the travel paths. The opportunities to see the various display surfaces for one or more (e.g., all) viewers in a region may indicate the display surface or surfaces to use for a given message. Using one or more machine-learned networks with trace data allows determination of the opportunity to view in the complex environment. A specific way to determine different than mental or human-based determination is provided. Rules, such as defined by the machine-based learning and not conventionally implemented by a human, are used to determine the opportunity to view.

The method of FIG. 1 is implemented in the order shown (e.g., top to bottom or numerical) or a different order. For example, acts 10 and 11 are performed in parallel (simultaneously) or in any order. As another example, acts 12-14 are performed in any order.

Additional, different, or fewer acts may be performed. For example, act 14 might be omitted where a relative opportunity to view is determined. As another example, acts for selecting a geographic region, a demographic or behavior group, a type of display surface, a period, or other configuration of the determination may be provided.

Figure 4:
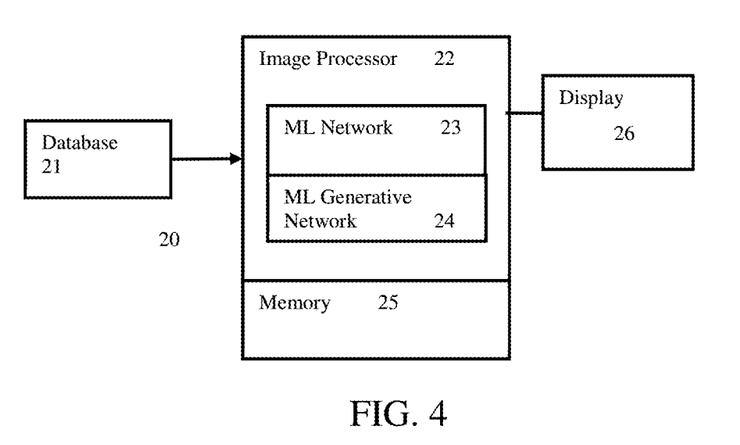
FIG. 4 is a block diagram of one embodiment of a system for determining an opportunity to view an object.

The method is implemented by the system of FIG. 4. In one embodiment, the method is implemented by an image processor, including machine-learned network or networks, a memory, and/or a display. A server, computer, or other image processor may be used. In one embodiment, parallel processing is used with one or more graphics processing units. Multiple devices may be used, such as one image processor to create a database of linked travel paths, mobile devices, and display surfaces, and another image processor to determine the opportunity to view based on the information in the database.

In act 11, the image processor links travel paths to objects (i.e., display surfaces). Any given travel path may be linked to one or more display surfaces.

The linking is based on a geometrical relationship of the travel path to the display surface. A catalog of display surfaces includes the location (e.g., longitude and latitude) and facing direction of each display surface. For mobile display surfaces, the facing direction, route, or other information is included in the database.

The database includes mapping information. In one embodiment, Open Street Maps is utilized as the road framework, supplying auto, public transit, bike, and pedestrian pathways across the US. Each road is segmented into small navigable chunks called edges, each with a unique ID and heading. Other mapping databases may be used.

The image processor links selected display surfaces to the edges in the road graph based on distance, building footprints, and/or congruence of the edge to the visible surface. A list of road edges that may view the display surface is linked to the display surface. Geometry determines whether the display surface is viewable.

Trace data may be used in the linking. In addition to linking the edges or travel paths based on the map, travel paths defined by trace data are linked. Trace data indicates the travel paths that are used, such as have a number of uses above a threshold. The trace data is used to limit the travel paths linked to any given display surface. Alternatively, the travel path from the mapping and routes from the trace data are common, so linking of the travel path to the display surface also links the routes from the trace data.

The display surfaces and linked travel path edges are used to determine the opportunity to see. Given a distance limit, an area or list of locations from which the display surface may be viewed is provided. Since the mapping may not capture information that changes or obstructions, further verification or definition of the ability to view the display surface from the edges may be provided.

In act 10, the image processor loads camera images from along the linked travel paths for one or more of the display surfaces. The images are of a scene around a location along the travel path captured by a camera. Images may be loaded from and/or generated by a mapping system. In one embodiment, the camera images are street level imagery, such as compiled from Google Street View and/or Mapillary.

The images are panoramic, such as having a range of 180 degrees or more (e.g., 270 or 360-degree views). The camera images are panoramic images provided from the travel path, capturing the approach to the display surface. The panoramic images may be cropped or altered to be for a range of views directed to the display surface, such as 180-270-degree range centered on the display surface.

Each of the camera images may include multiple objects including the display surface. The objects may be other display surfaces, obstructions, natural objects (e.g., trees), buildings, or any other object.

One or more images are loaded for each edge. In one embodiment, the edge is traversed. 270-degree snapshots on the approach from a farthest point to a closest point to the display surface along the edge are loaded. Images from locations every 2 meters or other step sizes are loaded until the end of the edge is reached or until the location along the edge is orthogonal to the display surface.

The camera images are loaded for the travel paths, such as in a database with the travel paths (e.g., edges). Alternatively, the camera images are acquired and loaded due to the travel path being linked to a display surface of interest.

In act 12, the image processor identifies objects in the camera images. A machine-learned network is applied. The images are input, and the network outputs a segmentation of the objects (e.g., the locations with or without a label for the type of object). The objects in the camera images are identified spatially and/or by type (e.g., tree, vehicle, building, billboard . . . ).

Any machine-learned network may be used. Any type of machine training and corresponding network may be trained. A single class or binary classifier, collection of different classifiers, cascaded classifiers, hierarchal classifier, multi-class classifier, or combinations thereof may be used. Multi-class classifiers include CART, K-nearest neighbors, neural network (e.g., multi-layer perceptron), mixture models, or others. A probabilistic boosting tree may be used. Error-correcting output code (ECOC) may be used. Deep learning may be used. A neural network is trained using deep learning. Deep adversarial architectures may be used to improve the performance of the segmentation. In one embodiment, a recurrent neural network or other convolutional network architecture is used.

The network is trained from a training data set using a computer or other machine. Any number of annotated sets of data is used. For example, about 1,000 or more camera images are annotated. The annotation indicates ground truth segmentation (e.g., spatial locations of objects and labels of objects by type). This large number of annotations allows learning of relevant features of the input vector and/or to relate input features from the images to the segmentation. For a neural network, the network learns various feature vectors for distinguishing between desired segmentations and background. Once trained, filter kernels or other convolution, nodes connections, and weights for the neural network are stored.

In application, the network outputs segmentations given an input image, even where the input image is different than any of the images used for training. The loaded camera images, such as a frame sequence along an edge, are applied to the machine-learned network, which locates and segments the objects (e.g., visible objects above a given size including the display surface). The output is a sequence of images, along with labels and bounding geometry for each label per frame.

To verify the ability to view the display surface determined from the geometry in linking, the machine-learned network is applied to the loaded images. This machine-learned network outputs the segmentation. Where the segmentation includes the display surface, the linking is verified. Where the segmentation does not include the display surface or a threshold amount of the display surface, then the edge is not linked. The spatial locations of the objects in the image may be used to determine obstruction of view of the display surface from the location corresponding to the camera image. Other images along the edge may be checked, where the linking occurs where a threshold number of the images include the display surface. The machine-learned network is used to ensure that the display surface may be viewed from the proposed edge and/or location along the edge.

The geometric information and the verification of viewability from application of the machine-learned network are used to link the travel paths or edges to the display surface. The linking may be repeated for other display surfaces.

The linking produces a database of edge identifiers (IDs) to display surface IDs that describes the navigable routes on which the display surface may be viewed (e.g., approached and seen). Once the link is established, the full vector field that allows an observer to see this display surface is calculated. A distance limit may be applied, such as 1 km. The distance may be based on the size of the display surface. The vector field accounts for obstructions from the mapping database and/or the segmentation from the machine-learned network. A dataset of display surface ID, with a geometry that represents the capture zone of the display surface for each of the selected display surfaces (e.g., all display surfaces of a given type or types in a given region), is generated.

In act 13, the image processor identifies numbers of mobile devices traveling along the travel paths linked to one or more of the display surfaces. In one embodiment, a database of traffic count data is used. Department of transportation statistics at the national, state, or city level may be used, such as the count per day, peak count or time, annual average, and/or projected counts. Public transit data, such as counts for different routes may be used. The numbers of vehicles for a given time, day, month, and/or year for each edge are determined. The number may be weighted by expected or statistical numbers of viewers per vehicle.

Instead of or in addition to statistics, trace data may be used. The mobile devices are cellular telephones, whether in a vehicle, on a bike, or carried by a pedestrian. SafeGraph or other sources provide publisher level device level trace (GPS) data on 10-15% of the total US population every day. This trace data records the longitude, latitude, timestamp, and a unique identifier called the advertising ID per second, minute, or other temporal resolution. The trace data indicates the number of mobile devices at a given edge or edge location over a given period.

The trace data may be sparse, such as indicating locations for a given mobile device with one or more gaps of any distance. To extrapolate the sparse trace data to the spatial/temporal resolution used to traverse the edges, the routes of the mobile devices are determined. The image processor is configured to determine continuous routes for the mobile devices from the sparse sampling of the trace data.

For each mobile device, the route traveled by that device for a given trip (e.g., over a period with trace data showing difference locations) is interpolated and/or extrapolated. The partially observed (e.g., sparse) trace data is connected using the mapping. The shortest travel path connecting the locations of the observed trace data is selected, forming the route. Other information may be used, such as the time between locations, locations along the route from other trips by the same mobile device, routes of other mobile devices, congestion, addresses (starting and ending) associated with the mobile device, and/or other information. The route is reconstructed from the partially observed traces. One or more routes are reconstructed for each mobile device. Routes are reconstructed for the various mobile devices.

The routes are then broken down into the sequences of edges for linking the mobile devices to the display surfaces. The routes traverse various travel paths. Mobile devices on edges that match or are linked to any of the display surfaces are assigned to the respective display surface. For example, if mobile device M and N both traversed edge 1, and display surfaces AA1, AB2, and AC3 all are visible from edge 1, then both mobile devices M and N are linked to all three display surfaces. The linking includes the time that the mobile devices were on those edges and their velocity.

Routes that are not on a current edge are treated as standalone vectors and matched against the vector field representing the viewability of the display surface. After accounting for obstructions from the mapping database and/or detected by image processing with the machine-learned network, the vector field represents the locations from which the display surface may be viewed. This vector field is used to link the un-mapped route, such as where someone walks through a park (i.e., undefined with respect to edges of the mapping). The locations along the route are directly checked against the vector field or area of viewability. For example, cosine similarity providing any overlap of greater than 95% or other threshold is accepted. If an individual trace has an overlap of 95% or more with one of the known visible approaches, the trace is flagged. If the pool of traces on this path becomes greater than a threshold (e.g., 50), a unique route is determined.

This operation may be performed only where a threshold number of routes use the undefined travel path. If the volume or number of vector matches for any display surface goes above a threshold, a custom run of the pipeline to build up the custom approach map is triggered.

The mobile devices with continuous routes that include the travel paths (e.g., edges) linked to the display surface are assigned to the display surface. After linking the mobile devices to the display surfaces, each display surface has linked edges including the number of mobile devices in routes using the edges, the identity of those mobile devices, the speed of the mobile device along the edge, angle of the edge to the display surface, the time the mobile device traversed the edge, and the mode of transport (e.g., walking, bike, car, bus, train, or boat). The number of mobile devices along each edge for a given period may be determined from the linked data.

The number of mobile devices is based on trace data, which represents 10-15% of the actual viewers. In act 14, the number of mobile devices is up-sampled to represent a likely number of viewers. Each mobile device is up-sampled to a representation at the population level. The up-sampling may be weighting or scaling by an average up-sample statistic, such as multiplication by 10. This allows the 10-15% sample from trace data to encompass the full population. The number assigned to each display surface is increased to account for the sparsity in population of the trace data.

In other embodiments, a Bayesian approach is used to up-sample by demographic and/or behavior group. Each mobile device has a census home block group with or without further demographic profile information, such as block group information associated with the ad ID of the mobile device. Sources of demographic or behavior (e.g., psychographic) grouping include ESRI, MRI, GFK, and/or US Census. Accurate population level counts, even for small demographic or behavioral groups, may be derived from statistics represented as a Bayesian or other model. The accuracy may be verified on holdout data and gold truth data sets that are never supplied to the model. After up-sampling, numbers of mobile devices or viewers represented by mobile devices are assigned to the display surfaces based on the demographic and/or behavior reflected in block groups or other sources of the mobile devices. For example, one display surface is linked to 211 mobile devices a day for women ages 20-30 that visit science museums.

The linking of the edges and mobile devices creates a database for display surfaces. For example, over 700,000 pieces of out of home (OOH) display surfaces are stored with linked metadata from mobile devices and travel paths. For each display surface, the edge ids that can view the display surface over all the transport modes (e.g., walking, biking, cars, bus, train, boat . . . ), the average speed, the high and low points in numbers per day for traffic flow, the total number of devices that pass by, and the geospatial area where it is possible to view the display surface (e.g., a vector field of all possible viewing angles that fall on the face of the display surface) are stored as part of the database. Demographic or behavior information may also be stored or may be derived from other information based on the stored information (e.g., based on stored block groups or mobile device identification). The facing data, the height from the ground, the size, format type (e.g., billboard, wallscape, outside transit, inside transit, poster, plastered poster . . . ), and/or another characteristic (e.g., digital or static, lighted or not, . . . ) of each display surface may also be stored in the database.

The database or linked numbers and/or edges are used to emulate the visual systems of the viewers. Rather than simply using the counts or numbers and other database information, the likelihood of the viewer actually viewing the display surface is modeled. For example, as a person drives along an edge, that person may focus on different locations, some of which place the display surface outside of their focus and/or peripheral vision. Further, even where a display surface may both be viewed and is within a likely view of the viewer based on focus, other objects may draw the attention of the viewer, resulting in less likelihood that the viewer's attention is on the display surface. Rather than using simple counts, image processing is used to determine the opportunity to view the display surface. The image processing accounts for focus of the viewer and/or attention of the viewer.

In act 15, the image processor models the focus of the viewer. While a human may know their focus, the image processor uses computer processing to model the focus since the actual focus is unknown from the trace data. Rules different from convention are used to model the focus of the viewer.

In one embodiment to model the focus of the viewer, the image processor randomly perturbing a center of focus of the camera images. A center of focus is assigned to each linked mobile device from the trace data or as up-sampled. Each represented viewer has a center of focus assigned at each location for which there is a camera image along the edge. A visual field or physical area of a mid-term visual system of a human (e.g., within 1 km and within a range of angles to the edge) is defined by the center of focus.

The initial center of focus is dependent on the mode of locomotion. A bus passenger, depending on the bus seat configuration, may be unlikely to see display surfaces along the edge (e.g., center read) unless the road changes trajectory and the display surface becomes a parallel read on either side of the bus. For instance, bus passengers are aligned based on which way they appear to be facing and where they are in the vehicle, while auto passengers are affixed forward along their velocity vector. A viewer in a car or on a bike is more likely to center focus straight ahead or along the edge. Pedestrian travel may more easily see parallel reads and either extreme of elevation than a driver in a car.

Figure 2:
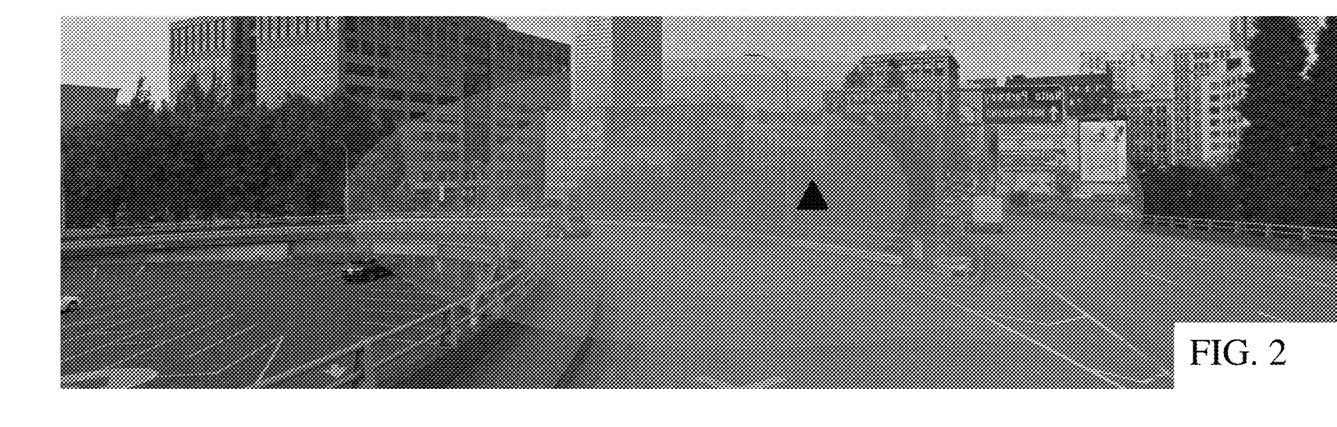
FIG. 2 is an example image with a distribution for random perturbing of the center of focus.

This perturbation process considers the travel model to help guide the center of focus accordingly. Based on the model of transport, a center focus is assigned for each camera image. The viewer model determines the range of angles from the center of focus included in the view. FIG. 2 shows an example image where the initial center of focus is straight ahead for a driver or car occupant.

The center of focus over time or over the images is randomly perturbed to mimic human saccades. Rather many viewers with the same center of focus, random perturbation of the center of focus is used so that different viewers have different centers of focus. As a person views their environment, their eyes jump from one center of focus to another. The random perturbation in the center of focus models this saccade behavior. The center of focus assigned to each camera image is perturbed to alter the center of focus in the image to mimic the natural range of human saccades to form an annotated video unique to this user.

A pseudo random angular offset from the selected or default center is applied for each of the camera images along the edge. The center of focus shifts in different directions and/or different amounts for different ones of the camera images for a same viewer. The randomization may be constrained, such as selected from a bell curve or other distribution modeling saccade behavior. The randomization is repeated for each viewer so different viewers may have different centers of focus at a same location. FIG. 2 shows an example where probability distribution (e.g., Gaussian random position) is overlaid on the image in a series of concentric ovals, with the randomly determined focus more likely to be in the smaller ovals. In the example of FIG. 2, the black triangle represents the randomly selected pixel or location given the probability distribution of center of focus locations form the initial center of focus.

Figure 3:
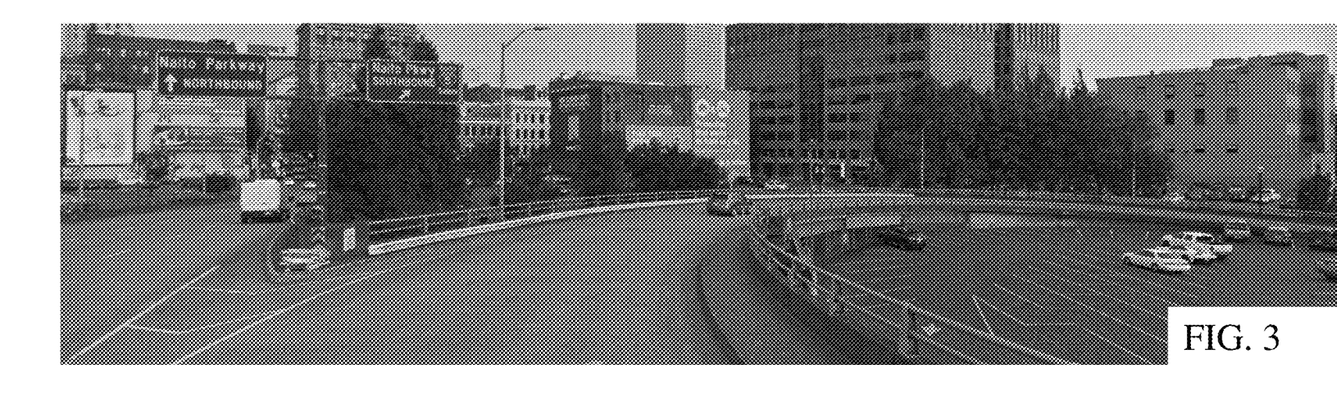
FIG. 3 is an example image based on the perturbed center of focus of FIG. 2.

The random perturbation results in perturbed focus images along the travel path where the center of focus and view angles shift over time and location from the default center of focus. The view angles are used to crop the camera image. Alternatively, the center of focus is perturbed without cropping. The center of focus is used to weight the likelihood of viewing the display surface, so cropping may not be needed where the distance from the center of focus acts to reduce likelihood. FIG. 3 represents the image of FIG. 2 rotated and cropped to center the perturbed focal location (black triangle of FIG. 2) as the center of the image. The image of FIG. 3 is input to the attention mapping.

Using the route and the camera images along the route, videos (e.g., sequence of images with perturbed centers of focus) are generated for each viewer. The images have different centers of focus, so the camera image with a different center assigned may be used. Alternatively, the camera image is cropped, blurred or otherwise altered to emulate the perturbed center of focus.

The viewer travels along the route at a given rate or a variable rate. The trace data may indicate the rate, and/or the rate is derived from mapping information, such as the speed limit and/or traffic control devices (stop signs or stop lights). Different viewers may travel at different speeds. The speed affects the likelihood of viewing the display surface. The image processor may generate additional images for slower speed and/or remove images for faster speeds. The rate of images by spatial location may be constant along an edge or vary. The perturbed center of focus may also be repeated, or the images are repeated and then the center of focus is perturbed through the sequence of images.

In one embodiment, each image is repeated N times. N is derived from the speed of the vehicle at the aligned edge and/or location. N may also account for the additional delay induced by traffic control devices. A long stop at a red light increases the value of N, providing the observer longer to take in the scene. Congestion metrics, such as an average time to drive by year, month, week, day, or hour, may also be used. Data on traffic control devices such as stop signs or lights, and the length of induced delay may be used to vary N. In other embodiments, images may be removed (i.e., not use some locations for which images are available). In alternative embodiments, images are not repeated, and the sequence of images does not account for speed. Speed may be accounted for in estimating attention.

In act 16, the image processor determines a likelihood of viewing the display surface of an object from the camera, perturbed focus images, and/or perturbed centers of focus. For a mobile device traveling along the travel path, the likelihood of viewing the display is based on the center of focus. A distance of an edge or center of the display surface from the perturbed center of focus indicates the likelihood of viewing the display surface. Other approaches may be used, such as using a machine-learned network that outputs a likelihood given the center of focus and the image (perturbed or camera image).

The likelihood may account for attention of the viewer. The camera image may include multiple different objects. A viewer may be more or less likely to view a display surface based on the other objects. The attention addresses the amount of competition for viewing in the scene. Other display surfaces, business signs, artwork, trees, buildings, . . . in the general viewing region result is less attention on a given display surface. The amount of the visual field occupied by different objects may affect the attention of the viewer.

The attention may be based on studies. From the literature, the number of saccades the viewer's fovea is likely to make over an object as a percent over the entire saccades for the scene and/or other objects is derived. Attention may be stable, when computed over a series of approaching images. Attention may be apportioned symmetrically, so A→B is the same as B→A.

In act 17, the probability of viewing a display surface is weighted for attention. The likelihood based on the center of focus is altered to account for attenuation. Alternatively, the likelihood is directly determined from the center of focus and attention information as the weighting.

The image processor determines a rating for attention for each object or for each object of interest in the perturbed focus or camera images. Image processing is used to determine the rating. The rating may be a weight or adjustment in likelihood or a separate attention value to be used with the center of focus to find the likelihood.

In one embodiment, an attention map is generated. The image processing outputs a map of attention levels by image location or object. Using the images allows the attention determination to respond to changes in foliage or other changes (e.g., scaffolding, new signage, . . . ). The changes reflected in images, which may be updated more frequently than transportation counts, may result in more dynamic attention determination.

For each of the mobile devices or viewers, a relative attention of the viewer on the display surface to others of the objects is estimated. In one embodiment, the estimation is based on relative size and distance between the objects in each image. The segmentation and labeling of objects in the images are used to determine relative attention. Any distribution or mapping of size and distance to attention may be used. Different objects are assigned different levels of attention with or without consideration of the center of focus.

In another embodiment, the attention is estimated by a machine-learned network. The panoramic, camera, and/or perturbed focus images are input to the machine-learned network, which outputs an attention value for the display surface and/or an attention mapping for objects of the images. The machine-learned network is trained with ground truth data of images mapped with attention by object.

Any machine learning may be used. For example, a generative machine-learned network, such a generative adversarial neural network is used. The generative network is an image-to-image convolutional deep-learned network. An image is input, and a synthetic image is output based on deep learned convolutions and other operations. The network learns to generate an image from an image. For application of the learned generative network, the network only takes the imaging data as input, but other inputs may be provided, such as center of focus and/or speed. The generative network encodes the imaging data to a few independent latent variables and generates synthetic data by sampling the latent variables. In deep learning, the latent variables are learned by machine training. The generative network returns a prior log-likelihood and is implemented as a piecewise-differentiable function, such as used in deep learning. For example, the generative network is a deep learned model using restricted Boltzmann machines, deep belief network, neural autoregressive density estimators, variational auto-encoders, extensions thereof, or other deep learning approaches for generative modeling. In one embodiment, the trained deep generative network is a deep neural network with a set of j convolutional layers and k fully connected layers, each followed by a non-linear activation function, a set of pooling layers for features reduction, and a set of upscaling layers for image generation. Encoding and decoding are provided. Other layer arrangements may be used. The arrangement of SegNet, without a soft max layer to provide for a regression output, may be used.

For training the generative network, a computer, workstation, server, or other processor accesses a database of hundreds or thousands of example images with known attention maps. The machine learns the generative network from the images and ground truth attention maps of the database. Using a piecewise-differentiable function or other deep learning function, the machine trains the deep generative network to output a spatial distribution of attention in response to an input image.

To train the generative model, the log-likelihood of the output is maximized. The generative model encodes features (i.e., kernels of the convolution layers) that represent the attention in the images. Since generative training is unsupervised, training does not require matched pairs of good and bad images, which is difficult to acquire on a large scale in a medical setting. The generative network is trained with deep machine learning to output probabilities by spatial location of the location in the input image drawing attention from a viewer. The probability map is determined for any input imaging data. The probability map is a spatial distribution of probability of attention. Since objects are associated with attention, the probability map has attention by object or higher attention at objects compared to background. The map is a spatial distribution, such as calculating the probability for each pixel based on the values of surrounding or neighboring pixels.

In one embodiment, the deep learning for the generative network uses a discriminator network. Generative adversarial training is used. The discriminator network is a neural network trained to determine whether an attention map is a ground truth (i.e., training data) or synthetically created by the generative network. The accuracy of attention mapping by the generative network may be increased using the adversarial training. Using a second network (i.e., discriminator network) to decide between a generated and ground truth attention map allows for an improvement in the results of the generative network being trained.

The results from training the discriminator network are used to further train the generative filter network. An iterative process is used, where both networks communicate results for training each other. The generative network uses the output of the discriminator network as an indication of sufficiency (i.e., the discriminator network ability to tell the difference from ground truth is to be minimized). The discriminator network uses the output of the generative network as an input to learn to discriminate.

Once trained, the generative network parameters (e.g., machine trained features, kernels or layer values) are used to compute the probability for each pixel. Pixels with intensity and neighborhood intensity distribution that do not match those of the generative model will have a low probability. Pixels with intensity and neighborhood intensity distribution that do match those of the generative model will have a high probability. Inverse probabilities may be used.

Once trained, the generative network is applied without the discriminator network. The generative network outputs an attention map in response to input of the imaging data. For example, a probability mask indicating the amount of attention by pixel or object in the imaging data is output. Thresholding, low pass filtering, region growing, clustering, or other post processing may be applied to the attention map to reduce outliers or group attention by object or region.

In one embodiment, the attention is used as part of a distance function to determine the likelihood of viewing the display surface for each viewer along each edge. The likelihood is determined by a distance from the perturbed centers of focus to points of attention determined by the attention map output by the machine-learned network. The points of attention (e.g., locations of above average attention probability) output based on the input camera or perturbed focus images are used in a distance formulation to find the likelihood of viewing the display surface. The attention map is a density map of attention for salient features including the display surface.

The distance of the display surface from a point of attention and the perturbed center of focus for a given location, time, and image indicates the likelihood of viewing the display surface. One example representation of this distance is given by:

$$\text{distance(attention, pixel)} = \exp\left(-\frac{(x_{attention} - x_{pixel})^2 + (y_{attention} - y_{pixel})^2}{2\sigma_s^2}\right)$$

where $x_{attention}$ and $y_{attention}$ are an image location with a greatest attention probability, $x_{pixel}$ and $y_{pixel}$ are the center of focus, and $\sigma$ is an empirically determine value to normalize or calibrate the results to align with market surveys on viewability. Such surveys may be from transit and/or traditional modes of transport. Other functions may be used, such as using a summation or weighted average based on attention at different locations and/or different possible focal locations. A distribution or probability surface of likelihood may be created.

To determine the likelihood of viewing by a viewer over the edge linked to the display surface, the distance is calculated for each location or image along the edge. The pixel wise distances from the point of attention (most salient object or pixel based on the attention map) at each frame from the focus is measured for each point along the edge. The distribution over time, t, of the likelihood of viewing is determined, as represented by:

$$\sum_{pixel \in image} dist(\text{attention, pixel}) \cdot \exp\left(-\frac{(t_{frame} - t)^2}{2\sigma_t^2}\right)$$

This summation is over pixel distances and time. The summation provides a probability of viewing the display surface given attention based on other objects and the modeled center of focus, as provided by the distance, dist, as a function of attenuation and the pixel of focus.

Processing through the sequence, a series of feature importance maps that indicate a level of saliency for each object in the frame is used to determine the distance for each image. In other approaches, the attention maps are clustered to produce a series of feature-based predictions for each frame that describe the boundary of the attended object. Using the feature maps for each location and the segmented objects from the images, the congruence is measured. The congruence is mapped to a rating (e.g., likelihood of being viewed by that viewer traversing the linked edge) for the display surface.

In a further embodiment, the machine-learned network for estimating attention is a variational autoencoder, whose aim is to take an input image and reconstruct the attention one salient object at a time. The network architecture includes an input encoder, a recurrent neural network, a decomposition model, another encoder, and a decoder. Additional, different, or fewer parts or layers may be used. The attention and perturbed focus are used to determine the opportunity to view. The perturbed center of focus is used to define the image input for attention determination.

The input encoder is trained to receive the input image and build a hidden representation of the image. The input encoder is one or more convolutional layers and pooling layers, such as a stack of convolutional layers with max pooling layers in between.

The recurrent neural network is trained to track a peek state representing an order of objects in a viewer's shifting attention. The peek state indicates, for the hidden representation of the image output by the input encoder, where a viewer directs their attention, in what order to different parts or objects in the image, and/or what parts of the image have already received attention or likely to receive multiple views. The model follows a spatial plan in how the scene in the image is processed relative to attention. Using feed forward and feedback connections in the neural network The recurrence layers introduce memory and the ability to look backward through time. The neural network is trained to follow the human eye as represented from training data tracking eye focus over images as the ground truth. Alternatively, the ground truth data is based on a ranking of object saliency where the most salient objects will get attended to first and receive more of the storage budget. In one embodiment, the number of hidden layers and layer sizes (e.g., number of parameters) is limited to have a fixed number of free slots to which the model can write. In training, the network learns what information to keep and what to write over A scene decomposer models is trained to predict which objects are present, as well as where the objects are likely to be located in the image. This model produces a location to crop. A generalized area of attention-based combinations of objects is determined, defined as the peek region. This peek region is used as an attention area, where other locations are cropped. The peek region defines a region or canvas for populating attention by the generative network.

An encoder receives the attention region and encodes the image and/or the peek state into a low dimensional space. This forces the model to pick areas of the image the that can be explained in very few free parameters, ones that are have a high inner correlation. For instance, large swarths of the background may be explained in only ten parameters, where as a very eye-catching wall scape might take a few hundred.

A decoder generates the attention map from the image of the attention region as represented in the low dimensional space of the encoder. The decoder decodes the output of the encoder and places the results onto the canvas. The attention map is the decoded canvas.

The generative network is trained end-to-end (e.g., all the parts are trained together in one process) to minimize the distance between the source image and the reconstruction using adversarial training (i.e., discriminative network). In other embodiments, different parts are trained separately. The generative network learns to use a limited budget of peeks and storage to reduce this distance. Using the generative network, the importance of an object in a scene is inferred by the order in which the object was peeked or viewed and/or how much of the storage space is allocated to describing the object. The importance is the attention index. The complexity of the scene is indicated by how many steps the model takes to generate the canvas or reproduced image and/or the number of unique elements the model segments in the input image. The output of the decoder is the pixel representation of the attention crop, placed onto the blank canvas. The full canvas image is built one peek at a time, where each peek is encoded, decoded and then copied onto the canvas. As this model runs, every place that is written to the canvas is tracked along with how many resources went into producing this portion of the recreation.

Using the peek-based model for the generative network, N is used as an upper bond on the number of peeks the model takes to rebuild the scene. Instead of or in addition to repeating images, the speed as reflected in N is input to the generative network to control attention. If a viewer is moving very fast, the viewer is less likely to view objects far from their center of view, unless the objects are highly impactful and/or in high contrast to the remainder of the scene.

The peek-based model is applied to the images of the sequence for a viewer. Instead of using pixel distances, a product of the attention index and the complexity of the representation forms a distribution over each. The attention index is the order that each region of the input image was attended to, where earlier is interpreted as better or more attention. The order in which model is making peeks is tracked. The output of the decoder is a pixel output corresponding the models interpretation of the peek region (crop). Averaging over the edge, a probability to view the display surface is provided. Other combinations of the attention index and/or complexity may be used.

In act 18, the probability of viewing the display surface is determined for each viewer with routes linked to the display surface. The output is a display surface identifier, an edge identifier, and the probability of seeing the specified display surface over the whole approach along the edge. This may be repeated for other edges linked to the display surface. The probability is based on all or a subset of the viewers and/or edges in a selected period that may view the display surface. Any of the congruence, pixel-wise distance, attention index, peek level, complexity, or other distribution of attention may be used to estimate the probability.

The probability of viewing a display surface given attention with or without focus modeling is used as the measure of opportunity to view the display surface. The opportunity may account for multiple viewers by averaging over the viewers. The average may be scaled by the number of viewers, such as multiplying the average probability of viewing by the number of viewers along linked edges within a period. Other combinations representing the opportunity by viewers moving along linked roadways, given other distractions or demands for attention in the view, may be used. The attention weights the opportunity by accounting for other objects or the relative attention.

In one embodiment, the image processor determines the opportunity to view as a count. A threshold is applied to the probability of viewing the display surface for each viewer. A count of the number of viewers with a sufficient probability of viewing is the opportunity to view.

The opportunity to view may be expressed as a time spent able to view the display surface. The time spent is based on the focus and/or attention. The probability over time for each viewer is different. The amount of time the probability is over a threshold is a measure of opportunity. The count may indicate a time spent. The probability as thresholded and time may indicate a time spent viewing the display surface.

Other information may be derived. Since the opportunity to view is based on probabilities, a confidence interval may be calculated.

The image processor may determine the opportunity to view by demographic and/or behavior group or groups. Representative travel patterns by group are provided. The up-sampled population by group linked to a display device is used. Rather the determining the opportunity for all linked viewers, the opportunity is determined for sub-sets of the viewers. The sub-set is based on the demographics and/or behavior grouping. The opportunity to view is, for example, reported as a count using any demographic or behavioral attributes. Any temporal limits may be used, such as a given demographic over a given period. Variance over time of the opportunity to view may be determined, such as the opportunity at a minute level of accuracy. For example, at 4:45 to 5:00 PM on a Tuesday, 350 Millennial Moms had the opportunity to view a given display surface, where that time is used due to being a peak time during the week in a given month. At another time (e.g., 6:00 pm to 6:15 pm) on Friday, 203 of the Millennial Moms had the opportunity.

Due to the use of trace data and the rapid processing due to application of machine-learned networks, the opportunity to view for many different situations are available quickly. This allows refinement and efficiency in determination and use of the opportunity to view.

In act 19, the opportunity to view is transmitted. The image processor outputs the opportunity to view as a count, average probability, distribution, or other representation. The likelihood of viewing, as weighted or indicated by attention, is used to find the opportunity to view, which is output. The opportunity to view may be for a selected audience or grouping of viewers. Opportunity values for all, selected, or multiple display surfaces may be determined, allowing for comparison. A comparison measure may be calculated.

The transmission is to a display device. Transmission to memory, a report, and/or over a computer network may be provided.

FIG. 4 shows a system 20 for determining an opportunity to view an object. The system 20 implements the method of FIG. 1 or another method. The system 20 is for application of one or more machine-learned networks as how to determine the opportunity. Given input images, the system 20 uses a network to model attention and/or identify objects competing for attention. In one embodiment, a machine-learned generative network generates attenuation maps as spatial distributions from the images. These maps and/or the identified objects are used to determine the opportunity to view an object in the image.

While the system 20 is described below in the context of application of the previously learned network or networks, the system 20 may be used to machine train the generative network.

The system 20 includes an image processor 22, a memory 25, a display 26, and a database 21. The image processor 22, memory 25, and display 26 are shown separate from the database 21, such as being part of a workstation, computer, or server. In alternative embodiments, the image processor 22, memory 25, and/or display 26 are part of the database 21. In yet other embodiments, the system 20 does not include the database 21. Additional, different, or fewer components may be used.

The database 21 is a memory, such as a buffer, cache, RAM, removable media, hard drive, magnetic, optical, database, or other now known or later developed memory device. The database 21 is a single device or group of two or more devices. The database 21 is associated with or part of the image processor 22, but may be outside or remote from other components of the system 20.

The database 21 is configured by a processor to store data. Any of the data discussed above for FIG. 1 may be stored. For example, trace data, extrapolated routes, display surface inventory, camera images, segmented objects, labeled objects, centers of focus, perturbed images, perturbed centers of focus, edges (e.g., roadway segments), demographic information, behavior information, identifications, links, probabilities, and/or opportunity to view information is stored. Rather than storage in a given database, different databases may be accessed as information is needed.

The memory 25 is a buffer, cache, RAM, removable media, hard drive, magnetic, optical, database, or other now known or later developed memory device. The memory 25 is a single device or group of two or more devices. The memory 25 is associated with or part of the image processor 22 but may be outside or remote from other components of the system 20.

The memory 25 stores the machine-learned networks 23, 24. For example, one machine-learned network 23 for segmenting and/or labeling objects in an image is stored. Another machine-learned generative network 24 for generating distribution of attention over space and/or time is stored. Additional, different, or fewer machine-learned networks may be stored.

The memory 25 is a non-transitory computer readable storage medium with processing instructions. The networks 23, 24 include weights, filter kernels, node connections, and/or other information defining the trained networks, which configure the image processor as instructions for generating outputs based on inputs. The memory 25 stores data representing instructions executable by the programmed image processor 22. The instructions for implementing the processes, methods and/or techniques discussed herein are provided on computer-readable storage media or memories, such as a cache, buffer, RAM, removable media, hard drive or other computer readable storage media. The machine-learned generative network (I2I network 85) and/or segmentation classifier 87 may be stored as part of instructions for fissure localization and/or lobe segmentation. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The image processor 22 is a general processor, digital signal processor, three-dimensional data processor, graphics processing unit, application specific integrated circuit, field programmable gate array, digital circuit, analog circuit, quantum computer, combinations thereof, or other now known or later developed device for determining opportunity to view a display surface. The image processor 22 is a single device, a plurality of devices, or a network. For more than one device, parallel or sequential division of processing may be used. Different devices making up the image processor 22 may perform different functions, such as one processor segmenting objects in images with the network 23 and another processor generating attention information with the network 24. The image processor 22 is a hardware device or devices configured by or operating pursuant to stored instructions, design (e.g., application specific integrated circuit), firmware, or hardware to perform various acts described herein.

The image processor 22 is configured to determine a viewability area of a display surface of an object from roadway segments with the machine-learned network 23, estimate a time spent by each of a plurality of mobile devices in the viewability area from trace data for the mobile devices, adjust the time spent by an amount of attention from another machine-learned network 24 responsive to images of the objects from the roadway segments (e.g., alter a count of viewers above a threshold reflecting opportunity to view), and calculate the opportunity to view for the object from the adjusted times spent in the viewability areas. The time each device spent in the area is used to guide the choice of how many looks the model gets to take in for any scene. The more looks the model gets, the higher the probability of seeing an object becomes.

The display 26 is a CRT, LCD, plasma, projector, printer, or other output device for showing an image or other output of the image processor 22 and/or database 21. The display 26 displays the opportunity, relative opportunities of different display surfaces, and/or other information derived from the opportunity, demographic information, and/or behavior information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

I claim:

1. A method for determining an opportunity to view a first object in an image processing system, the method comprising:
    linking a travel path to the first object based on a geometrical relationship of the travel path to the first object;
    loading camera images from along the travel path linked to the first object;
    identifying, by a first machine-learned network, the first object and other objects in the camera images, the identifying correcting the linking where the first object is not identified;
    randomly perturbing a center of focus of the camera images;
    determining a likelihood of viewing the first object from the perturbed center of focus and from attention determined by a second machine-learned network, the second machine-learned network being a generative adversarial network trained to indicate attention over space based on the first object and other objects and the camera images;
    outputting the opportunity to view the first object based on the likelihood.

2. The method of claim 1 wherein linking the travel path comprises linking the travel path and other travel paths to the first object based on the geometrical relationship and other geometrical relationships and a verification of the first object being in the camera images from the travel path and other travel paths, the verification based on the first machine-learned network.

3. The method of claim 1 further comprising:
    determining continuous routes for mobile devices from the sparse sampling of trace data for the mobile devices; and
    assigning the mobile devices that include the travel path in the continuous routes to the first object;
    wherein the opportunity to view is based on the likelihood for each of the mobile devices.

4. The method of claim 3 further comprising assigning numbers for the mobile devices based on demographic and/or behavior reflected in block groups of the mobile devices;
    wherein the opportunity to view is based on the numbers.

5. The method of claim 1 wherein outputting the opportunity to view comprises outputting a count of viewers for the first object, the count based on the likelihood.

6. The method of claim 1 wherein loading the camera images comprises loading panoramic views of at least 180 degrees.

7. The method of claim 1 wherein randomly perturbing further comprises repeating the camera images at a rate based on a speed of a mobile device along the travel path, the randomly perturbing being on the camera images and the repeated camera images.

8. The method of claim 1 wherein randomly perturbing comprises randomly perturbing in a mimic of human saccades.

9. The method of claim 1 wherein randomly perturbing comprises randomly perturbing with the center starting based on a mode of travel of a mobile device.

10. The method of claim 1 wherein identifying comprises identifying with the first machine-learned network comprising a recurrent neural network.

11. The method of claim 1 wherein determining the likelihood comprises determining with the generative adversarial network trained to generate a density map of attention for salient features including the first object.

12. The method of claim 1 wherein determining the likelihood comprises determining by a distance from the centers of focus in the perturbed focus images to points of attention determined by the second machine-learned network.

13. The method of claim 1 wherein determining the likelihood comprises determining from attention complexity and/or an order of viewing the first object and other objects.

14. The method of claim 1 wherein outputting comprises outputting the opportunity to view the first object as a count where the count is incremented where likelihood is above a threshold.

15. The method of claim 1 wherein outputting the opportunity to view comprises outputting the opportunity to view the first object based on a demographic or behavior group.

16. The method of claim 1 wherein the first object comprises a display surface, wherein the travel path comprises a road or walkway, and wherein the opportunity to view comprises the opportunity to view the display surface of a person moving along the road or walkway.

* * * * *